US007014243B2

(12) United States Patent
Nakajo

(10) Patent No.: US 7,014,243 B2
(45) Date of Patent: Mar. 21, 2006

(54) SUNSHADE DEVICE

(75) Inventor: Yasuhiro Nakajo, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 11/135,483

(22) Filed: May 24, 2005

(65) Prior Publication Data

US 2005/0275239 A1 Dec. 15, 2005

(30) Foreign Application Priority Data

May 25, 2004 (JP) ............................ 2004-155112

(51) Int. Cl.
*B60J 3/00* (2006.01)

(52) U.S. Cl. ................ 296/97.4; 296/97.8; 160/370.22

(58) Field of Classification Search ............... 296/97.4, 296/97.8, 97.12, 97.13; 160/370.22, DIG. 2, 160/DIG. 39

See application file for complete search history.

(56) References Cited

U.S. PATENT DOCUMENTS 5,067,546 A * 11/1991 Jeuffray et al. ........ 160/370.22
5,291,934 A 3/1994 Ouvrard et al.
6,422,291 B1 * 7/2002 Brunnert et al. ........... 296/97.4
6,557,616 B1 * 5/2003 Schlect ...................... 296/97.8
6,668,902 B1 * 12/2003 Bong ....................... 296/97.8
2004/0144506 A1 * 7/2004 Walter et al. .......... 160/370.22

FOREIGN PATENT DOCUMENTS

JP 05-231083 9/1993
JP 2000-085347 3/2000
JP 2000-351349 12/2000
JP 2002-002275 1/2002
JP 2002-522282 7/2002

* cited by examiner

*Primary Examiner*—Jason Morrow
(74) *Attorney, Agent, or Firm*—Jean C. Edwards, Esq.; Akerman Senterfitt

(57) ABSTRACT

In the sunshade device, the sheet-like sunshade is contained drawably inside a sunshade frame mounted on a backside vehicle body of a rear parcel shelf and drawn out of a drawing outlet of the sunshade frame via an access opening of the rear parcel shelf. The sunshade device has a cover which is attached to a rail mounted on a drawing end of the sunshade and covers the access opening and an engagement unit provided in the rail and the cover for fixing the cover to the rail by engagement, wherein the engagement unit achieves the engagement by a mutual pressing of the rail at the drawing end of the sunshade rewound to the access opening and the cover in a state where the rail and the cover face to each other.

6 Claims, 3 Drawing Sheets

SUNSHADE DEVICE

The present application claims foreign priority from Japanese patent application no. P.2004-155112, filed on May 25, 2004, the contents of which are incorporated herein by reference.

BACKGROUND OF THE INVENTION

1. Field of the Invention

The present invention relates to a sunshade device in a rear window of a vehicle, particularly, to a sunshade device provided with a cover for covering an access opening of a rear parcel shelf.

2. Description of the Related Art

In electrically-operated sunshade devices used for shading person sitting at a backseat of a vehicle from the sun, an arm driven system for performing operations of drawing up and down a shade by way of arms separately provided at a left end and a right end of a rail disposed at a drawing end of the shade for the sun-shading is a primary system. Such sunshade devices have a sunshade frame for rewinding and housing drawably the sunshade which is in form of a sheet for shielding from sunlight on a rear window. The sunshade frame is usually mounted on a vehicle body at a position backside of the rear parcel shelf which is located in the vicinity of a lower end of the rear window. The sunshade is drawn out of a shade drawing outlet of the sunshade frame via an access opening of the rear parcel shelf.

Some of the above-described sunshade devices have a cover which covers the access opening for the purpose of improving appearance of interior of the vehicle, wherein the cover is provided on a drawing rod at an edge of the sunshade which is drawn out via the access opening of the rear parcel shelf (see Japanese Patent Examined Publication JP-B-7-122387 and Japanese Patent Unexamined Publication JP-A-2000-85347).

Also, a sunshade device having a cover in the form of lips is known (see Japanese Patent Unexamined Publications JP-A-2000-351349, JP-A-2002-2275 and JP-A-2002-522282), wherein the cover is disposed around the access opening of the rear parcel shelf and used for reducing a gap between the access opening and the sunshade.

As shown in FIG. 5, the sunshade device 100 disclosed in the JP-A-7-122387 has a blind rim adjuster (equivalent to a cover of the present invention) 101 serving also as a blind cover and fixed to a drawing rod 103 at the edge of a sheet (equivalent to a sunshade) 102 with a fastening member 104 such as a bolt and a pin.

Since the cover 101 is positioned above the rear parcel shelf 110, it is necessary to attach the cover 101 after mounting the sunshade device 100 and then the rear parcel shelf 110 on a vehicle body. In this case, it is necessary to attach the cover 101 to the drawing rod 103 using the fasting member 104 in a state where the sunshade 102 is drawn out of an access opening 111 in an upward direction. Therefore, this sunshade device has a drawback that it is difficult to mount the sunshade device on the vehicle body.

Further, in the case of attaching the cover 101 using the fastening member (not shown) such as a bolt in a state where the sunshade 102 is housed, the fastening member is exposed on the cover 101 to undesirably deteriorate the appearance of interior.

Also, the sunshade device (not shown) disclosed in the JP-A-2000-85347 has such a structure that the sunshade device is mounted on a box-shaped garnish with a curtain (equivalent to the sunshade of the present invention) drawing outlet, wherein the garnish is mounted on a roof trim by the use of plural clips, and a cover for covering the sunshade drawing outlet is inserted into a stay member (equivalent to the drawing rod) at an edge of a sunshade to be fixed to the edge. Since the cover is positioned outside the garnish, too, it is necessary to attach the cover to the stay member at the edge of the sunshade in a state where the sunshade is drawn out of the sunshade drawing outlet of the garnish after mounting on the roof trim the garnish on which the sunshade device is mounted. Therefore, this sunshade device has a drawback that it is difficult to mount the sunshade device on the vehicle body like the one disclosed in the above JP-A-7-122387.

The sunshade device of the JP-A-2000-351349 has such a structure that: a flange is formed on each of left and right sides of a shade drawing outlet of a sunshade frame which rewinds and houses a sunshade body; the sunshade frame is disposed on a backside of a rear parcel shelf to insert the flanges of the sunshade frame through a mounting opening; the flanges are inserted into a dovetail groove of a cover unit constituted of two component parts; and the cover supports the sunshade frame. Therefore, this sunshade device has drawbacks that it is difficult to mount the sunshade device on a vehicle body as is the case in the JP-A-7-122387 and JP-A-2000-85347 and appearance is deteriorated because a drawing rod at a sunshade edge is exposed at an upper outside portion between the component parts of the divided cover unit which is fixed to the rear parcel shelf.

The sunshade device disclosed in the JP-A-2002-2275 has such a structure that a cover unit constituted of two component parts like in the JP-A-2000-351349 is disposed on and fixed to a rim of an opening formed on a mounting panel, and a latch holder (equivalent to a cover of the present invention) attached to a drawing rod of a sunshade edge covers an upper outside portion between the component parts of the divided cover unit fixed to the mounting panel. Since the latch holder (equivalent to the cover) is positioned outside the cover unit, too, it is necessary to attach the latch holder to the drawing rod at the sunshade edge in a state where the sunshade is drawn out via an opening of the cover unit. Therefore, this sunshade device has drawbacks that the structure for mounting the divided cover unit is complicated and it is difficult to mount the sunshade device to a vehicle body like those disclosed in the JP-B-7-122387 and JP-A-2000-85347.

SUMMARY OF THE INVENTION

In order to solve the above problems, an object of the present invention is to provide a sunshade device excellent in mounting easiness and appearance, the sunshade device enabling a cover which realizes good appearance of interior to be mounted on a sunshade in a simple manner after mounting the sunshade device and a parcel shelf on a vehicle body and in a state where the sunshade is housed.

In order to attain the above object, according to a first aspect of the present invention, there is provided a sunshade device, comprising:

- a sunshade frame having a drawing outlet and mounted on a vehicle body at a position backside of a rear parcel shelf;
- a sheet-like sunshade having a rail mounted on a drawing end thereof, the sunshade being contained drawably inside the sunshade frame and drawn out of the drawing outlet of the sunshade frame via an access opening of the rear parcel shelf;

a cover attached to the rail and covering the access opening; and engagement units provided in the rail and the cover for fixing the cover to the rail by engaging the rail with the cover, wherein the engagement unit engages by a mutual pressing between the rail and the cover when the drawing end of the sunshade rewound to the access opening so that the rail and the cover opposes each other.

According to a second aspect as set forth in the first aspect of the present invention, it is preferable that the sunshade device further comprising:

a pair of support members disposed below the drawing end of the sunshade, which is rewound to the access opening, so as to oppose each other across the sunshade for receiving an external force applied to the rail.

Note that the external force is a downward force applied to the cover when the cover is attached to the rail.

According to a third aspect as set forth in the first aspect of the present invention, it is preferable that the engagement unit comprises:

a clip having an elastically deformable engagement piece; and an engagement projection moving in an engaging direction by the mutual pressing to engage with the engagement piece.

According to a fourth aspect as set forth in the second aspect of the present invention, it is preferable that one of the support members is a sunshade guide for slidingly guiding the sunshade when the sunshade drawn out of the drawing outlet.

According to a fifth aspect as set forth in the fourth aspect of the present invention, it is preferable that the sunshade guide has a guide surface performed less friction treatment.

According to a sixth aspect of the present invention, there is provided an assembling method for a sunshade device, the sunshade device having:

a sunshade having a rail at an end thereof;

a sunshade frame containing the sunshade therein; and a pair of support members being capable of supporting the rail, a cover mounted to the rail and covering an access opening of a parcel shelf of the vehicle; and an engagement unit engaging the cover with the rail, the assembling method comprising the steps of:

fixing the sunshade frame to a vehicle body;

mounting the rear parcel shelf to the vehicle body while the sunshade is rewound to the access opening of the rear parcel shelf and the rail is supported by the pair of the support members; and mounting the cover to the rail via the engagement unit.

According to the first aspect of the present, the sunshade device has such a structure that the rail at the drawing end of the sunshade rewound to the access opening of the rear parcel shelf and the cover are engaged with each other by a mutual pressing in a state where the rail and the cover are opposed to each other. Therefore, it is possible to attach the cover which is excellent in appearance from outside to the drawing end of the sunshade rewound to the access opening easily after fixing the sunshade and the parcel shelf to the vehicle body in this order. Thus, mounting easiness of the sunshade device is remarkably improved to reduce time and cost for mounting the sunshade device and to improve appearance of interior.

According to the second aspect of the present invention, the sunshade device has, in addition to the effects recited in the first aspect of the present invention, such a structure that the pair of support members disposed below the drawing end of the sunshade rewound to the access opening receives an external force applied to the rail at the sunshade drawing end. Therefore, it is possible to assure stability for attaching the cover to the sunshade drawing end from outside the access opening.

According to the third aspect of the present invention, the sunshade device achieves, in addition to the effects recited in the first aspect of the present invention, increased easiness for attaching the cover to the sunshade drawing end from outside the access opening since the engagement unit has a clip having an elastically deformable engagement piece and an engagement projection capable of moving in a direction of engagement with the engagement piece to be engaged with the engagement piece.

According to the fourth aspect of the present invention, the sunshade device has, in addition to the effects recited in the second aspect of the present invention, such a structure that a sunshade guide of one of the support members guides the sunshade when the sunshade is drawn out of the drawing outlet of the sunshade frame. Therefore, it is possible to narrow the opening of the sunshade by holding the sunshade in a direction of drawing the sunshade away from the opening of the parcel shelf when drawing the sunshade. Thus, thanks to the narrowed opening, it is possible to reduce a width of the cover to save a weight and to improve an appearance of the cover.

According to the fifth aspect of the present invention, the sunshade device achieves, in addition to the effects recited in the fourth aspect of the present invention, effects of reducing friction between the sunshade and the sunshade guide caused by sunshade drawing and rewinding operations, improving durability of the sunshade and the sunshade guide, and preventing rasping noise otherwise caused by the sunshade and the sunshade guide thanks to a guide surface for guiding the sunshade in the less wearing manner.

DESCRIPTION OF THE PREFERRED EMBODIMENTS

Hereinafter, the sunshade device of the present invention will be described in detail in conjunction with embodiments illustrated in accompanying drawings.

Figure 1:
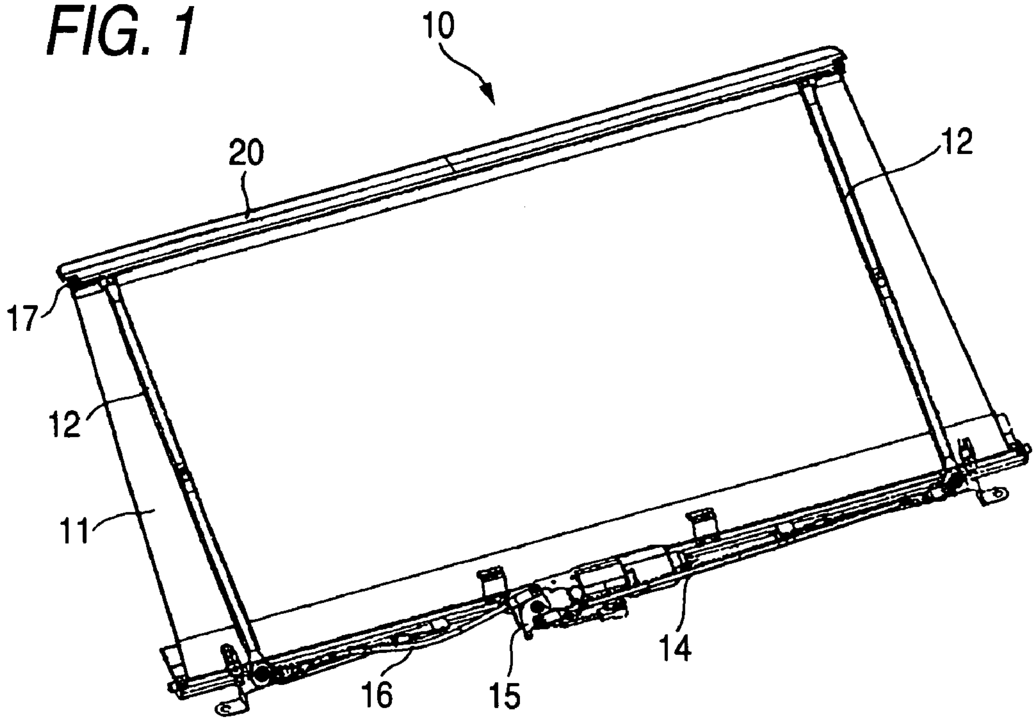
FIG. 1 is a perspective view schematically showing an overall structure of a sunshade device according to one embodiment of the present invention except for a sunshade frame in a state where a sunshade is drawn.
Figure 2:
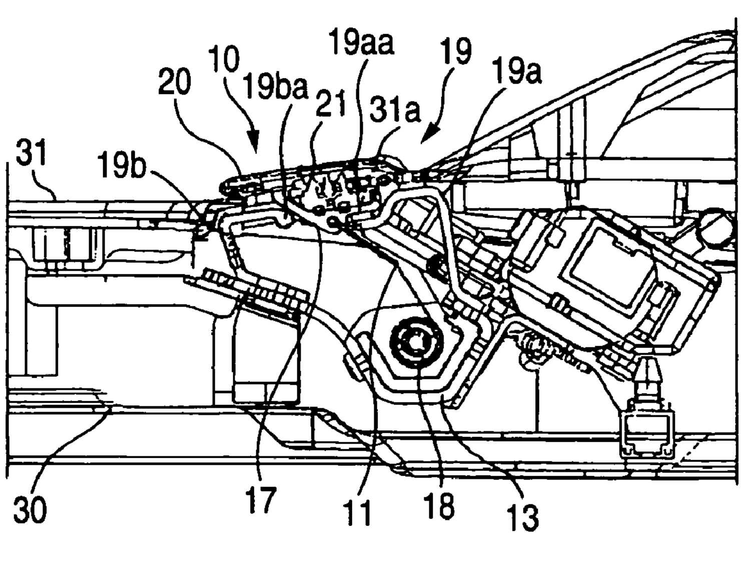
FIG. 2 is a side view showing a state wherein the sunshade device is attached to a vehicle body at a position backside of a rear parcel shelf and the sunshade is in a housed state where the sunshade is rewound.
Figure 3:
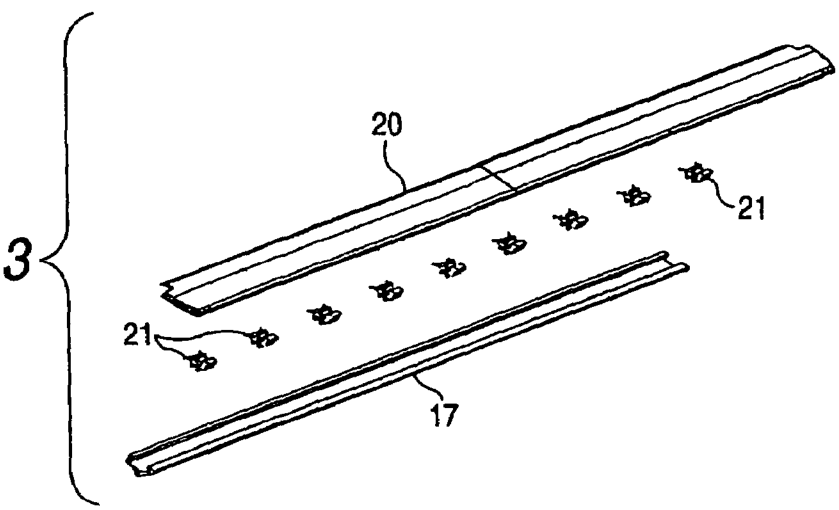
FIG. 3 is a diagram for illustrating a relationship among a rail of a sunshade drawing end, a cover, and a clip of the sunshade device.
Figure 4:
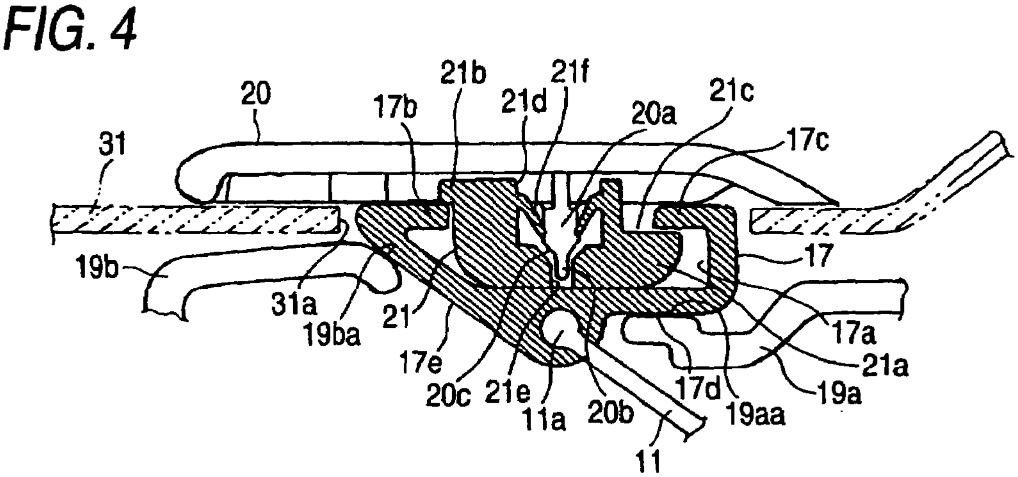
FIG. 4 is a horizontal sectional view showing a structure for attaching the cover to the rail of the sunshade drawing end in the sunshade housed state of the sunshade device.
Figure 5:
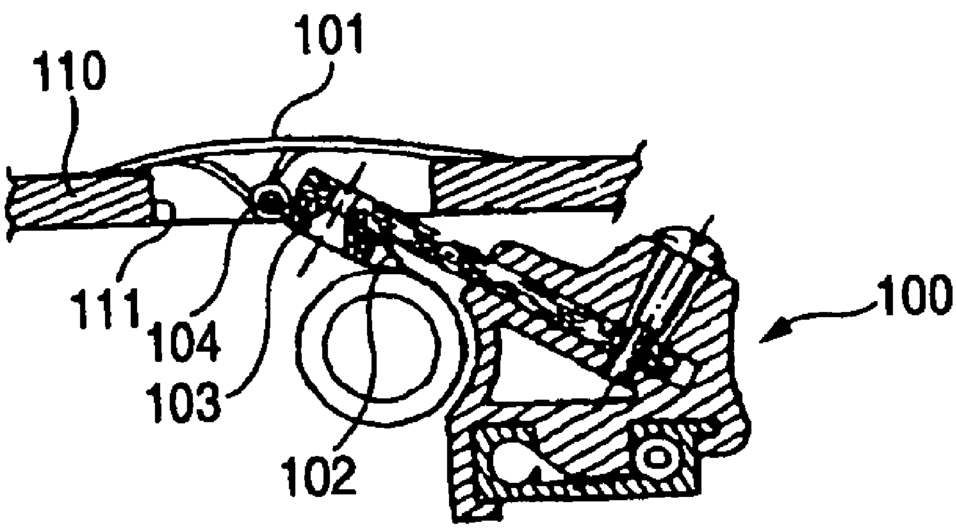
FIG. 5 is a horizontal sectional view showing an example of a structure for attaching the cover to a sunshade device of the related art in the sunshade housed state of the sunshade device.

FIG. 1 is a perspective view schematically showing an overall structure of a sunshade device according to one embodiment of the present invention except for a sunshade frame in a state where a sunshade is drawn. FIG. 2 is a side view showing a state wherein the sunshade device is attached to a vehicle body at position backside of a rear parcel shelf and the sunshade is in a housed state where the sunshade is rewound. FIG. 3 is a diagram for illustrating a relationship among a rail of a sunshade drawing end, a cover, and a clip of the sunshade device. FIG. 4 is a horizontal sectional view showing a structure for attaching the cover to the rail of the sunshade drawing end in the sunshade housed state of the sunshade device.

As shown in FIG. 1, a sunshade device 10 of this embodiment is of an electrically-operated arm driven system, wherein a rail 17 is provided at a drawing end 11*a* of a sunshade 11 in the form of a sheet for shading from the sun, and drawing and rewinding operations of the sunshade 11 are operated by the use of arms 12 separately provided on left and right sides of the rail 17.

The left and right arms 12 for the drawing and rewinding operations of the sunshade 11 are driven by a motor unit 14 provided at a substantially central part of a sunshade flame 13 of the sunshade device 10. Two rods 16 are connected to a link plate 15 provided at an output axis of the motor unit 14, each of the rods 16 being provided at a base of each of the arms 12.

When the link plate 15 is rotated by the motor unit 14, the rods 16 are driven to move horizontally. The left and right arms 12 rotate about the bases interlockingly with the movements of the rods 16 to extend and retreat the rail 17 provided at the drawing end 11*a* of the sunshade 11.

In this case, the rail 17 retreats simultaneously with rewinding of the sunshade 11 by a sunshade rewinding pipe 18 thanks to operation of a rewinding spring (not shown) which is provided inside the sunshade rewinding pipe 18 and constantly biases the sunshade 11 in a direction of the rotation of rewinding. In turn, in the case of drawing the sunshade 11, a biasing spring (not shown) which operates in a direction reverse to that of the operation of the rewinding spring reduces a load to be applied on during the sunshade rewinding.

The above-described basic structure of the sunshade device 1 is known, and it is possible to apply the present invention to sunshade devices of known systems without limitation to the above-described one. In the present invention, as shown in FIG. 2, the sunshade frame 13 is attached to a vehicle body backside 30 of a rear parcel shelf 31 at a rear portion of an interior of a vehicle, and the sunshade 11 is drawn out of a drawing outlet of the sunshade frame 13 via an access opening 31*a* of the rear parcel shelf 31.

A cover 20 for covering the access opening 31*a* is provided at an end of the rail 17 mounted on the drawing end 11*a* of the sunshade 11.

A pair of support members 19 is fixed to the sunshade frame 18, the support members 19 being opposed to each other across the sunshade 11 below the rail 17 at the drawing end 11*a* of the sunshade 11 rewound to the access opening 31*a* and supporting and receiving a bottom end of the rail 17 to which a rewinding force of the sunshade 11, a gravity, or a pressing force (to be described later) generated when attaching the cover 20 is applied.

One of the support members 19 is a stopper 19*a* having an abutting surface 19*aa* for receiving and supporting one of the bottom ends 17*d* of the rail 17 in the sunshade housed state where the sunshade 11 is rewound to the access opening 31*a*, and the other is a sunshade guide 19*b* having a guide surface 19*ba* for guiding the sunshade which is drawn out of the drawing outlet of the sunshade frame 18 when the sunshade 11 slidably contacts (slides to) the guide surface 19*ba*. The guide surface 19*ba* also has a function of receiving and retaining the other bottom end 17*e* of the rail 17 in the sunshade housed state like the abutting surface 19*aa* of the stopper 19*a*. The abutting surface 19*aa* of the stopper 19*a* and the guide surface 19*ba* of the sunshade guide 19*b* form the drawing outlet of the sunshade 11 of the sunshade device 10.

Since it is possible to reduce a width of the access opening 31*a* of the rear parcel shelf 31 by defining the position of the withdrawal of the sunshade 11 owing to the sunshade guide 19*b* as described above, it is possible to reduce a width of the cover 20 for covering the access opening 31*a* at the same time with saving a weight and improving an appearance of the cover 20.

An engagement unit for fixing the cover 20 to the rail 17 by engagement thereof is provided in the rail 17 and the cover 20. As described below, the engagement unit has such a structure that the rail 17 at the drawing end 11*a* of the sunshade 11 in the sunshade housed state where the sunshade 11 is rewound to the access opening 31 is engaged with the cover 20 when the rail 17 and the cover 20 are faced to each other and pressed toward each other.

As shown in FIGS. 2 and 4, the engagement unit has a clip 21 housed above the rail 17 and having an elastically deformable engagement piece 21*f* and an engagement projection 20*a* perpendicularly provided on a backside (lower part of the drawings) of the cover 20 in an integral fashion with the cover 20 and moving in a direction of engagement with the engagement piece 21*f* to be engaged with the engagement piece 21*f*. The engagement is achieved by the mutual pressing of the rail 17 and the cover 20 in the opposed state.

A housing hole 17*a* having the shape of a dovetail groove with flanges 17*b* and 17*c* formed at its opening is formed on a front surface of the rail 17 to house and fix the clip 21.

The clip 21 is formed from an elastic material such as a hard synthetic rubber and a polymer material. The clip 21 has a bottom corner having a spherical surface so as to be fitted easily into the dovetail shaped housing hole 17*a* of the rail 17 by elastic deformation. The clip 21 also has fixing members 21*b* and 21*c* which are abutted to a front surface of the flange 17*b* and a rear surface of the flange 17*c* of the rail 17 to be fixed to the flanges 17*b* and 17*c*. The fixing members 21*b* and 21*c* are separately provided on a left side and a right side of the rail 17. A depression 21*d* of which a bottom portion is a through hole 21*e* having a small diameter is formed at a central portion of the clip 21, and the engagement piece 21*f* to be engaged with the engagement projection 20*a* when elastically deformed by the intrusion of the engagement projection 20*a* of the cover 20 is formed in the vicinity of the opening of the depression 21.

The engagement projection 20*a* of the cover 20 has a tapered small diameter guiding member 20*b* provided at a tip of an axial body 20 and an enlarged diameter engagement unit 20 disposed between the axial body 20*a* and the small diameter guide member 20*b* via a tapered surface. When the engagement projection 20*a* of the cover 20 is pressed into the depression 21*d* of the clip 21 from above the clip 21, the small diameter guide member 20*b* and the engagement unit 20*c* of the engagement projection 20*a* push the engagement piece 21*f* downward inside the depression 21*d* at the same time with fitting of the small diameter guide member 20*b* into the through hole 21*e* at the bottom of the clip 21, so that the engagement unit 20*c* is engaged with the engagement piece 21*f*.

A plurality of the engagement projections 20*a* are provided on the cover 20, and a plurality of the clips 21 are disposed and housed in the housing hole 17*a* of the rail 17 as shown in FIG. 3.

With such structure of the engagement projection 20*a* of the cover 20 and the clip 21 near the rail 17, it is possible to attach the cover 20 easily to the rail 17 only by pressing the cover 20 in a state where the cover 20 is opposed to the rail 17 at the drawing end 11*a* of the sunshade 11 from outside of (above) the access opening 31*a* of the rear parcel shelf 31. That is, the cover 20 can be attached to the rail 17 while the sunshade 11 is wound in the sunshade frame 13.

Hereinafter, a procedure of attaching the sunshade device 10 having the above-described structure to a vehicle body 30 will be described.

The sunshade frame 13 of the sunshade device 10 is fixed to the vehicle body 30 with the bolt.

After fixing the sunshade device 10, the rear parcel shelf 31 is fixed to the vehicle body 30.

At this time, the sunshade 11 is in the sunshade housed state where the sunshade 11 is rewound to the access opening 31*a* (i.e., the rail 17 is located at the access opening 31*a*), and the bottom ends 17*d* and 17*e* of the rail 17 are supported by the support members 19 (the stopper 19*a* and the sunshade guide 19*b*).

Then, the engagement projection 20*a* of the cover 20 is inserted into the depression 21*d* of the clip 21 housed in the rail 17, and the cover 20 is pressed toward the rail 17 to be attached to the rail 17. Here, a load applied for pressing the cover 20 into the clip 21 is supported by the pair of support members 19 via the bottom ends 17*d* and 17*e* of the rail 17.

Thus, it is possible to attach the cover 20 from outside easily to the rail 17 at the drawing end 11*a* of the sunshade 11 which is rewound to the access opening 31*a* after fixing the sunshade device 10 and the parcel shelf 31 to the vehicle body 30 in this order.

It is possible to attach the cover 20 from outside the access opening 31*a* of the rear parcel shelf 31 easily to the rail 17 at the drawing end 11*a* of the sunshade 11 which is in the sunshade housed state after fixing the sunshade device 10 and the parcel shelf 31 to the vehicle body 30 in this order. Also, since the width of the access opening 31*a* can be reduced by defining a position of drawing the sunshade 11 by the use of the sunshade guide 19*b*, it is possible to reduce a width of the cover 20 for covering the access opening 31*a* at the same time with saving a weight and improving an appearance of the cover 20. Thanks to the above effects, mounting easiness of the sunshade device 10 is remarkably improved to reduce mounting time and cost and to improve an appearance of interior. Thus, the sunshade device is suitably used as a sunshade device for shading person seated in a backseat of a vehicle from the sun.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A sunshade device, comprising:

a sunshade frame having a drawing outlet and mounted on a vehicle body at a position backside of a rear parcel shelf;

a sunshade sheet having a rail mounted on a drawing end thereof, the sunshade sheet being contained drawably inside the sunshade frame and drawn out of the drawing outlet of the sunshade frame via an access opening of the rear parcel shelf;

a cover attached to the rail and covering the access opening; and engagement units provided in the rail and the cover for fixing the cover to the rail by engaging the rail with the cover, wherein the engagement unit engages by a mutual pressing between the rail and the cover when the drawing end of the sunshade sheet is rewound to the access opening so that the rail and the cover opposes each other.

2. The sunshade device according to claim 1, further comprising:

a pair of support members disposed below the drawing end of the sunshade sheet, which is rewound to the access opening, so as to oppose each other across the sunshade sheet for receiving an external force applied to the rail.

3. The sunshade device according to claim 1, wherein the engagement unit comprises:

a clip having an elastically deformable engagement piece; and an engagement projection moving in an engaging direction by the mutual pressing to engage with the engagement piece.

4. The sunshade device according to claim 2, wherein one of the support members is a sunshade guide for slidingly guiding the sunshade sheet is when the sunshade drawn out of the drawing outlet.

5. The sunshade device according to claim 4, wherein the sunshade guide has a guide surface performed less friction treatment.

6. An assembling method for a sunshade device, the sunshade device having:

a sunshade having a rail at an end thereof;

a sunshade frame containing the sunshade therein; and a pair of support members being capable of supporting the rail, a cover mounted to the rail and covering an access opening of a parcel shelf of the vehicle; and an engagement unit engaging the cover with the rail, the assembling method comprising the steps of:

fixing the sunshade frame to a vehicle body;

mounting the rear parcel shelf to the vehicle body while the sunshade is rewound to the access opening of the rear parcel shelf and the rail is supported by the pair of the support members;

mounting the cover to the rail via the engagement unit.

* * * * *